(12) United States Patent
Rainer

(10) Patent No.: US 7,041,222 B1
(45) Date of Patent: May 9, 2006

(54) PROCESS FOR THE REMOVAL OF TOXIC METALS FROM WATER

(76) Inventor: Norman B. Rainer, 2008 Fondulac Rd., Richmond, VA (US) 23229

(*) Notice: Subject to any disclaimer, the term of this patent is extended or adjusted under 35 U.S.C. 154(b) by 51 days.

(21) Appl. No.: 10/862,042

(22) Filed: Jun. 7, 2004

(51) Int. Cl.
*B01D 15/00* (2006.01)

(52) U.S. Cl. ............ 210/660; 210/661; 210/688; 210/749; 210/912; 210/913; 210/914

(58) Field of Classification Search ........ 210/660, 210/661, 688, 749, 912–914
See application file for complete search history.

(56) References Cited

U.S. PATENT DOCUMENTS

| 4,332,916 | A | 6/1982 | Thill |
| 5,336,704 | A | 8/1994 | Rainer |
| 6,403,726 | B1 * | 6/2002 | Ward ............... 525/328.3 |
| 6,521,340 | B1 * | 2/2003 | Rainer ............... 428/402 |
| 2002/0161122 | A1 * | 10/2002 | Rainer ............... 525/178 |

* cited by examiner

*Primary Examiner*—Chester T. Barry
(74) *Attorney, Agent, or Firm*—Norman Rainer

(57) ABSTRACT

A process for the selective removal of toxic heavy metals from a flowing stream of water involves causing the stream to flow through a stationary bed of particulate polymer having amine functional groups, and injecting into the stream, adjacent the upstream extremity of the bed, a substantially continuous flow of carbon disulfide.

13 Claims, 1 Drawing Sheet

PROCESS FOR THE REMOVAL OF TOXIC METALS FROM WATER

BACKGROUND OF THE INVENTION

1. Field of the Invention

This invention relates to the removal of dissolved metals from water, and more particularly concerns polymers and the use thereof for the absorptive removal from aqueous media of trace amounts of dissolved ionized species of metals.

2. Description of the Prior Art

Various techniques are known for removing dissolved ionized metals from water. Activated carbon has long been used for the absorption of dissolved metals from aqueous media. The most significant use of activated carbons for absorption of dissolved metals is in gold mining operations. In such use, activated carbon granules absorb gold in the form of aurocyanide anion produced by the leaching of gold ore with dilute solutions of sodium cyanide. Although effective in said removal of gold from ore, long contact times on the order of 24 hours are required in a tumbling operation.

The removal of nuisance or toxic metals from aqueous streams has generally been accomplished by precipitative methods wherein an ingredient capable of forming an insoluble compound with the dissolved metal is added to the stream. Sufficient interaction time is usually achieved in a holding vessel wherein the insoluble compound forms and grows into a crystalline solid of filterable size. The solid is then removed by settling, filtration or centrifugation, and is usually discarded as a sludge which in fact may require expensive disposal costs.

The separation of dissolved species from water may also be achieved by way of reverse osmosis techniques wherein a pressurized aqueous stream is fed to a selectively permeable membrane. Although reverse osmosis operations are successful in specialized applications, the requisite high pressurization is costly, and the membranes are susceptible to fouling. Also, a concentrated rejectate stream containing the removed species may constitute a significant disposal problem.

Ion exchange resins of strong acid or strong base functionality have been used for the absorption of commonly abundant dissolved cations and anions, respectively. However, commonplace ion exchange resins cannot remove trace ions because they indiscriminately absorb commonly abundant innocuous ions such as Na, K, Mg, Al, Ca, etc., leaving no residual absorption capacity for trace species. Specialized ion exchange resins, referred to as "chelation" resins are known which selectively absorb only "heavy" metals. Such specialized resins are usually comprised of beads of styrene/divinylbenzene polymer having grafted iminodiacetic acid groups. "Heavy" metals are generally toxic species, usually found in only trace levels in natural waters or industrial effluents. The heavy metals may be further characterized as transition group metals classified in groups I B through VIII B of the Periodic Table, and generally characterized in having incomplete inner rings of electrons or being otherwise capable of existing in more than one valence state.

When a metal-saturated chelation resin must ultimately be disposed of, it is found that the preferred method of disposal, namely incineration, is not a viable option because of the large amounts of volatile aromatic hydrocarbons generated during incineration. The aromatic hydrocarbons are considered to be toxic substances. Although said aromatic hydrocarbons can be removed from the incineration gases by activated carbon, large amounts of the carbon are required.

Chelation resins are not generally capable of removing toxic species to extremely low concentration. For example, where it is desired to remove species such as mercury or lead to concentrations below one part per billion (ppb), chelation resins are usually ineffective. One explanation for said shortcoming is that forces of bonding that hold the metal ion are not sufficiently strong to prevent some dissociation.

The use of aliphatic polymers of nitrilotriacetic acid (NTA) and polyethylenimine (PEI) for the selective absorption of dissolved ions has been disclosed in U.S. Pat. Nos. 3,715,339; 4,332,916; 5,002,984; 5,597,850; and elsewhere. Said PEI-based polymers, having recurring amine groups and iminodiacetic acid groups, absorb cationic species by two different mechanisms. In one mode of function, the amine groups serve as ligands which form a metallo-organic coordination compound with the cation. In a second mode of function, the iminodiacetic acid groups form a chelation ring which includes the absorbed cation. Whereas some cations, such as a copper, cadmium and lead become strongly bound to the polymer, presumably because of bonding via both mechanisms, other heavy metal cations are not sufficiently bound to produce residual concentrations below 1 ppb.

U.S. Pat. No. 6,521,340 discloses the vapor phase reaction of carbon disulfide with water-swollen particles of NTA/PEI polymer in a sealed container to incorporate dithiocarbamate groups into said polymers. The effect of the incorporation of said dithiocarbamate groups is to cause the polymer to exhibit higher affinity for cationic heavy metal ions. In particular, aqueous streams treated with the $CS_2$-modified polymer show smaller effluent concentrations of heavy metal cations.

It has been found, however, that said dithiocarbamate-containing polymers have poor storage stability. In the course of storage in sealed industrial containers at temperatures in the commonplace range of 40° F. to 80° F., the dithiocarbamate groups split off the polymer with evolution of $H_2S$. Not only does such decomposition downgrade the capabilities of the polymer, but the $H_2S$ which accumulates within the container is hazardous because of its toxicity and flammability.

It is accordingly an object of the present invention to provide a process for the selective removal of heavy metals from a flowing stream of water.

It is a further object of this invention to provide a process as in the foregoing object which employs a stationary bed of polymer in particulate form, through which said stream is caused to flow.

It is another object of the present invention to provide a process of the aforesaid nature wherein sulfur-based functional groups are incorporated into said polymer during passage of said stream through said bed.

It is yet another object of this invention to provide a process of the aforesaid nature wherein said metals are in dissolved ionic form, and said heavy metals are accompanied by larger amounts of non-heavy metals.

These objects and other objects and advantages of the invention will be apparent from the following description.

SUMMARY OF THE INVENTION

The above and other beneficial objects and advantages are accomplished in accordance with the present invention by a process for the selective removal of toxic heavy metals from a flowing stream of water comprising causing said stream to flow through a stationary bed of particulate water-swollen polymer having amine functional groups whereby said bed has opposed upstream and downstream extremities and the residence time of the water flowing through said bed is between 1 and 5 minutes, and injecting into said stream adjacent said upstream extremity a substantially continuous flow of carbon disulfide.

BRIEF DESCRIPTION OF THE DRAWING

For a fuller understanding of the nature and objects of the present invention, reference should be had to the follow drawing forming a part of this specification.

DESCRIPTION OF THE PREFERRED EMBODIMENTS

Figure 1:
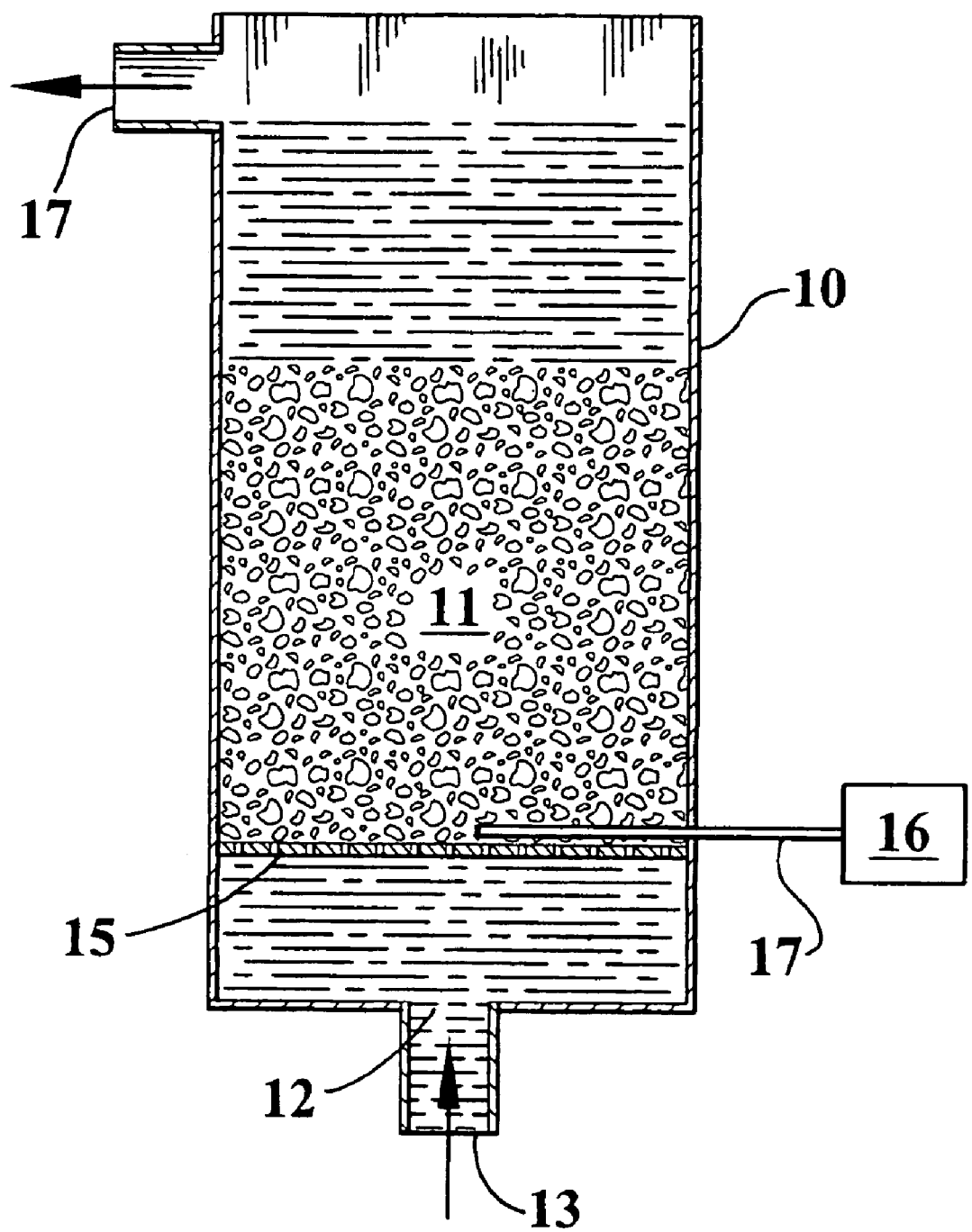
FIG. 1 is a vertical sectional view of an embodiment of a vessel 10 suitable for confining a stationary bed of particulate water-swollen polymer 11 while enabling a flowing stream of water 12 to enter said vessel at an upstream extremity 13 and exit from a down stream extremity 17. A grate 15 supports the bed of polymer within the vessel. A metering pump 16 controllably advances carbon disulfide through a narrow inlet tube 17 into contact with entering water stream 12.

The stream of water to be treated is preferably alkaline, having a pH in the range of 7.0 to 11.5. The bed of polymer is disposed in an elongated configuration confined within a vertically oriented cylindrical vessel equipped with a bottom retaining grate or screen. The water stream may be passed upwardly or downwardly through the bed confined within the vessel. In such configuration, having a height (H) and diameter (D), the ratio H/D is preferably in the range of 1.5 to 8. For the purpose of the present invention, the expression "stationary bed" includes a bed which may be in a fluidized state by virtue of a strong upward flow through the confining vessel.

The amine functional groups of the polymer are preferably primary amine groups (—NH$_2$). A particularly preferred polymer is the reaction product of nitrilotriacetic acid (NTA) with polyethylenimine (PEI). PEI contains primary, secondary and tertiary amine groups. The NTA interacts with the secondary amine groups of the PEI to produce cross-linking by way of amide bonds, thereby leaving the primary amine groups intact. The production of such polymer is described in U.S. Pat. No. 6,521,340 and elsewhere. Other suitable polymers containing primary amine groups include partially cross linked polyvinylamine, and polymers of acrylic acid partially cross linked with diamines such as ethylene diamine, propylene diamine, and diethylene triamine. Such amine-containing polymers usually have affinity for heavy metals because the amine groups serve to form coordination complexes with metals.

The polymers useful in the practice of the present invention are considered to be hydrogel polymers because they have the ability to absorb water to produce a swollen state comprised of between 40% and 60% water. The water-swollen state promotes rapid diffusion of dissolved metals into the polymer particles, thereby enhancing the rate of removal of dissolved metals from the water stream undergoing treatment. At water contents above about 60%, the particles lack adequate cohesive strength to permit normal handling, and at water contents below about 40%, diffusion into the particle is diminished.

The particulate form of the polymer includes granular and bead particles, and small pieces of porous or sponge substrates within which said polymer is accessibly deposited. Granular particles have an irregular shape, and are employed in the size range between about 8 and 50 mesh (U.S. Sieve Series). Bead particles are preferably of spherical contour, and are employed in the size range of 20 to 60 mesh. Porous substrates that can be made to contain useful polymers include pearlite, vermiculite, volcanic ash, and open celled cellulosic sponge. The sponge particles may be in the form of cubes ranging in size between about ¼" and ½". The production of suitable polymer-containing sponge cubes is described in U.S. Pat. No. 5,002,984, and elsewhere.

The size, configuration and manner of packing of the particulate polymer in forming the bed are such as to produce an acceptably low impedance to the flow of the water being treated. Accordingly, the polymer bed of this invention should preferably have an impedance of less than 8 psi per foot of bed depth at a superficial flow velocity of 10 gallons/minute/square foot of cross-sectional area of the bed.

The process of the present invention is primarily directed toward selectively removing trace amounts of toxic heavy metals from aqueous streams that additionally contain relatively large amounts of commonly abundant innocuous dissolved metal species such as Na, K, Ca, Mg and Al. The amounts of said innocuous metals may be ten-fold to hundred-fold greater than the amount of toxic heavy metal sought to be removed. The speed of removal, namely the duration of time that the flowing stream of water is required to be in contact with the bed of polymer, is extremely important from the standpoint of economics and practicality. For example, if the rate of flow of a water stream undergoing treatment is 10 gallons per minute, and the requisite contact time for removal of a targeted metal is one minute, then a polymer bed of only ten gallons of drainage volume is needed. If, however, a contact time of six minutes is required, a bed having sixty gallons of drainage volume is needed. This represents a six-fold increase in the cost of the needed polymer and six-fold increase in the cost of ultimate disposal of the metal-saturated polymer. The increased volume also requires greater pumping pressure to drive the water through the bed. In general, the process of this invention can achieve greater than 50% removal of heavy metals from an aqueous stream within a 2 minute contact time. Longer contact times produce greater removal efficiencies up to about 99% removal at 5 minute contact time.

In the process of this invention, carbon disulfide (CS$_2$) is continuously added to the bed of polymer at a site adjacent the upstream extremity of the bed, whether at the top or bottom of the bed. Although not wishing to be bound by theoretical considerations, the CS$_2$ is considered to slowly dissolve in the water and then react under basic conditions with primary amine groups of the polymer in accordance with the following equation to form the base salt of a dithiocarbamate:

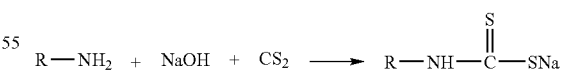

wherein R is the remainder of the polymer

The effect of the incorporation of dithiocarbamate groups into the hydrogel polymer is to cause the polymer to exhibit high affinity for cationic heavy metal ions. This is presumably because heavy metal ions interact strongly with the dithiocarbamate groups. Aqueous streams treated by the process of this invention can produce treated effluents having concentrations of heavy metals below one part per billion.

It has also been found that the $CS_2$ treatment increases the saturation capacity of the polymer for heavy metals, and certain heavy metals appear to be deposited within the gel polymer as sulfides of the metals. While not wishing to be bound by theoretical interpretations, such phenomena may be explainable with the aid of the following equations which postulate the slow hydrolytic decomposition of dithiocarbamate groups with formation of hydrogen sulfide ($H_2S$). The $H_2S$ subsequently reacts with heavy metals (M) to form highly insoluble metal sulfides (MS):

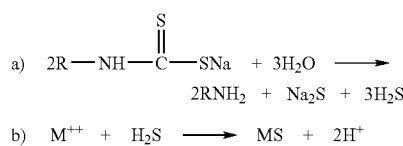

b)  $M^{++} + H_2S \longrightarrow MS + 2H^+$

The metal sulfides are retained within the gel polymer particles. Since the decomposition of the dithiocarbamate groups regenerates the amine group on the polymer, said amine group can undergo subsequent reaction with $CS_2$. This means that, in effect, the polymer, in one mode of function, serves to catalyze the reaction of metal ions with $CS_2$ to produce metal sulfides (MS)

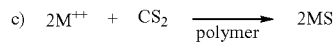

Such mechanism serves to explain why the polymers employed in the process of this invention can be caused to remove large amounts of heavy metals. In operation, said polymers are found to absorb 8% to 15% by weight of heavy metal (dry weight basis). When the water treatment process is continued beyond the point of saturation of the polymer with absorbed metals, particles of metal sulfides will form exteriorly of the gel polymer particles. This is generally undesirable unless the process of this invention is followed by a filtration step to remove the metal sulfide particles.

The expression "continuous" as employed herein to describe the manner of addition of $CS_2$ to the bed of polymer is intended to embrace the addition of $CS_2$ dropwise or as an unbroken stream. The $CS_2$ is preferably injected into the bed of polymer at a site adjacent the upstream or inlet extremity of the bed of polymer. The rate of addition is such that preferably one to six molecules of $CS_2$ are added for each molecule of heavy metal to be removed. For example, if a body of water is said to contain 1 ppm Hg, it means that one liter of the water contains 1 milligram of Hg. This represents 0.005 millimole of Hg because of its molecular weight of 200. In such case, the rate of addition of $CS_2$ should be between 0.39 and 2.34 mg per liter because of the molecular weight of 76 for $CS_2$, and the need to employ between one and six times the number of millimoles of $CS_2$ per millimole of heavy metal.

The controlled injection of $CS_2$ into the polymer bed can be achieved with a syringe pump such as KDS Series 200 infusion pump sold by Sigma-Aldrich, Inc. of St. Louis, Mo. The $CS_2$ is conveyed from the pump to the polymer bed by thin plastic tubing that penetrates the vessel wall. The $CS_2$ is preferably deposited at the center axis of the bed, but may be distributed transversely across the bed by way of porous tubing. The flow of the $CS_2$ is monitored volumetrically. The weight of the injected $CS_2$ is calculated based upon the specific gravity of $CS_2$ of 1.26.

A further understanding of my invention will be had from a consideration of the following examples which illustrate certain preferred embodiments. All parts and percentages are by weight unless otherwise indicated. It is understood that the instant invention is hot to be construed as being limited by said examples or by the details therein.

EXAMPLE 1

A prepolymer solution is prepared by adding 38 parts of NTA to a stirred solution of 40 parts of water and 40 parts of PEI having a molecular weight of about 1800. The resultant homogenous solution is poured into stainless steel trays to form layers of about ¾ inch depth.

The trays containing the prepolymer solution are placed in ovens at 155° C. The solution water evaporates to produce a paste-like deposit. With continued heating at the same temperature, the paste-like deposit forms viscous bubbles, and eventually hardens to a rigid bubbled mass. The trays are removed from the ovens.

A 0.5% solution of sodium hydroxide is poured into the trays to cover the bubbled mass, and allowed to stand 24 hours. The bubbled mass undergoes a decrepitation or self-granulation to produce a water swollen base-neutralized granular hydrogel polymer which contains primary amine groups.

The granules are wet sieved to produce a fraction that passes a 10 mesh sieve and is retained on a 40 mesh screen (and thereby designated 10/40 mesh size). When drained of free external water, the water content of the granules is found to be 51%.

The granules are loaded into a clear polyacrylate tank of 8" inside diameter equipped with a bottom grate having ¼" apertures, and a 40 mesh screen atop the grate. A sufficient quantity of granules are entered into the tank to produce a bubble-free bed having a height of 16 inches and a drainage volume of about 1.7 gallons of water.

A test solution is prepared from the chloride salts of copper, sodium, potassium and calcium to contain 1 ppm $Cu^{++}$, 100 ppm $Na^+$, 100 ppm $K^+$ and 50 ppm $Ca^{++}$, and adjusted to pH 8.5.

The test solution is pumped downwardly through the bed at a rate of 3200 cubic centimeters (cc)/minute to produce a calculated contact duration within the bed of 2 minutes. The pressure drop across the bed is 7.2/psi. $CS_2$ is metered into a site 2 inches below the top of the bed at a rate of 4 mg/liter of water flow.

A sharply defined black absorption band is produced, and descends the tank. The copper concentration in the effluent water is 8 parts per billion (ppb), representing a removal efficiency of 99%. A sample of Cu-saturated polymer taken from the top of the bed is found to contain 12.3% Cu (dry weight basis).

For comparison purposes, the same experiment is run but without the addition of $CS_2$. The absorption band now has a bright blue color. The effluent water contains 21 ppb Cu, and the Cu-saturated polymer contains 8.7% Cu (dry weight basis).

This example establishes that: a) the chemistry of metal absorption by the amine-containing polymer is altered by virtue of the presence of $CS_2$, b) the efficiency of metal removal is enhanced, and c) the capacity of the polymer to absorb metal is increased.

EXAMPLE 2

The experiment of Example 1 is repeated with the exception that the polymer employed is a polymer of acrylic acid cross linked with diethylene triamine in a manner to incorporate primary amine groups into the resultant hydrogel polymer.

Without the addition of $CS_2$, the effluent water is found to contain 300 ppb Cu, and the Cu-saturated polymer contains 1.5% Cu. With the addition of $CS_2$ in accordance with the process of this invention, the effluent water contains 25 ppb Cu, and the Cu-saturated polymer contains 4.2% Cu.

EXAMPLE 3

In order to demonstrate the effect of contact time in the process of this invention, Example 1 is repeated with the same rate of $CS_2$ addition but with varied flow rates of the test solution through the bed. Results obtained are presented in Table I.

TABLE I

| Contact Time* | 1 | 2 | 3 | 4 | 5 | 6 |
|---|---|---|---|---|---|---|
| Effluent Cu** | 15 | 8 | 2 | <1 | <1 | <1 |

*minutes
**ppb

EXAMPLE 4

In order to demonstrate the effect of the rate of addition of $CS_2$ in the process of the present invention, the experiment of Example 1 is repeated except for variation in the rate of $CS_2$ addition. Results obtained are presented in Table II.

TABLE II

| $CS_2$ RATE* | 1 | 2 | 3 | 4 | 5 | 6 |
|---|---|---|---|---|---|---|
| $CS_2$ RATE** | 0.8 | 1.6 | 2.4 | 3.2 | 4.0 | 4.8 |
| EFFLUENT Cu*** | 17 | 13 | 10 | 8 | <1 | <1 |

*mg/liter
**millimole $CS_2$ per millimole of initial Cu, based upon molecular weights of 76 for $CS_2$ and 63 for Cu.
***ppb

EXAMPLE 5

The process of this invention is particularly effective in removing trace levels of heavy metals from waters that also contain synthetic or naturally occurring chelating agents. Such feature is illustrated in the following experiment.

The particulate polymer of Example 1 is employed to form a bed of the same configuration as in said same Example. A test solution comprising groundwater containing 20 ppm Pb and 20 ppm ethylenediaminetetraacetic acid (EDTA) is run upwardly through the bed at a flow rate of 1600 cc/minute to produce a calculated contact duration of 4 minutes within the bed. The pressure drop across the bed is 3.3 psi, which represents about 2.5 psi/foot of bed depth at a superficial flow rate of 2 gal/min/sq.ft.

$CS_2$ is injected into the bed about two inches above the bottom grate at a rate of 25 milligrams per liter. This represents a mole ratio of $CS_2$/Pb of 3.3. The treated effluent water is found to have 80% less Pb.

By way of comparison, a similar experiment is carried out employing a commercially available chelating resin comprised of styrene/divinylbenzene beads containing iminodiacetic groups. (Product D850, sold by General Technologies, SPC of Overland Park, Kans.). The resultant treated effluent is found to have only a 15% reduction in Pb. This further demonstrates the effectiveness of the process of this invention in comparison with a prior art product intended for the selective removal of heavy metals.

EXAMPLE 6

The prepolymer of Example 1 is employed to impregnate ½" cube pieces of open celled sponge of regenerated cellulose. The impregnated pieces are squeezed between rollers to produce drip-free pieces having a 245% add-on of the solids content of the prepolymer solution.

The impregnated sponge pieces are then heated in an oven at 151° C. for one hour to achieve curing of the prepolymer to produce a sponge product containing 68% by weight of a hydrogel polymer containing primary amine groups.

The polymer-containing sponge pieces are loaded into a transparent polyacrylate column of 8" inside diameter, producing a bed of five foot height.

A 220 gallon sample of filtered river water having a pH of 7.2 and containing large amounts of naturally occurring sodium, potassium, calcium and magnesium, is spiked with 387 parts per billion (ppb) of mercury in the form of mercuric chloride. Said water sample is caused to flow by gravity at a rate of 2.10 gallons per minute downwardly through the bed, providing a residence time in the bed of 4.5 minutes. The pressure drop across the bed is 2.5 psi, and because of such low impedance to flow, gravity flow operation is facilitated.

$CS_2$ is injected into the bed at a site 2 inches below the top of the bed at a rate of 0.9 mg/liter, representing a six-fold molecular increase over the molecular concentration of the mercury.

Such treatment is found to produce a 92% reduction in the Hg concentration. When the test is repeated, but without $CS_2$ addition, the reduction in Hg concentration is only 67%. This treatment is suitable for in-situ or unattended operations where no pumping facilities are available.

The process of this invention may be conducted to remediate streams such as wastewater, groundwater, landfill leachate and storm water. The process can operate with water streams at temperatures between 1° C. and 45° C., the higher temperatures producing faster reaction rates. The metal-saturated particulate polymer material will generally pass the U.S. E.P.A. TCLP test, thereby qualifying as non-hazardous waste, with attendant reduced expense for disposal.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for the selective removal of toxic heavy metals from a flowing stream of water comprising causing said stream to flow through a stationary bed of particulate water-swollen polymer having amine functional groups whereby said bed has opposed upstream and downstream extremities and the residence time of the water flowing through said bed is between 1 and 5 minutes, and injecting into said stream adjacent said upstream extremity a substantially continuous flow of carbon disulfide.

2. The process of claim 1 wherein said stream of water additionally contains innocuous commonly abundant dissolved metals in amounts at least ten-fold greater than the amount of said heavy metals.

3. The process of claim 2 wherein said particulate polymer is in the form of granules.

4. The process of claim 3 wherein said granules are in the size range of 8 to 50 mesh.

5. The process of claim 3 wherein said granules have a water content in the range of 40% to 60% by weight.

6. The process of claim 3 wherein the impedance to flow through the bed is less than 8 psi per foot of bed depth at a superficial flow velocity of 10 gallons/minute/square foot of cross-sectional area of the bed.

7. The process of claim 3 wherein said bed is confined within a vertically oriented cylindrical vessel having a diameter (D), and has a height (H) within said vessel such that H/D is in the range of 1.5 to 8.

8. The process of claim 3 wherein the amount of carbon disulfide injected into said stream is sufficient to raise the concentration of carbon disulfide in said stream to 1 to 6 times the molecular concentration of said heavy metal.

9. The process of claim 1 wherein said polymer is the thermal reaction product of nitrilotriacetic acid with polyethyleneimine.

10. The process of claim 4 wherein said stream of water has a pH in the range of 7.0 to 11.5.

11. The process of claim 4 wherein greater than 50% of said heavy metal is removed from said stream.

12. The process of claim 2 wherein said particulate polymer is in the form of porous particles which contain said polymer.

13. The process of claim 11 wherein said heavy metal is in dissolved ionic form.

* * * * *